(12) United States Patent
Paske et al.

(10) Patent No.: US 8,893,972 B2
(45) Date of Patent: Nov. 25, 2014

(54) RFID READING TUNNEL FOR IDENTIFYING OBJECTS BY MEANS OF RFID

(71) Applicant: Sick AG, Waldkirch (DE)

(72) Inventors: Ralf Paske, Waldkirch (DE); Klemens Wehrle, Waldkirch (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 14/093,085

(22) Filed: Nov. 29, 2013

(65) Prior Publication Data

US 2014/0158766 A1    Jun. 12, 2014

(30) Foreign Application Priority Data

Dec. 7, 2012    (DE) .......................... 10 2012 111 986

(51) Int. Cl.
G06K 7/00    (2006.01)
G06K 7/10    (2006.01)
G06K 7/08    (2006.01)

(52) U.S. Cl.
CPC ............ *G06K 7/10316* (2013.01); *G06K 7/084* (2013.01); *G06K 7/10445* (2013.01)
USPC ....................................... 235/440

(58) Field of Classification Search
USPC ....................................... 235/440
See application file for complete search history.

(56) References Cited

U.S. PATENT DOCUMENTS

2009/0134221 A1    5/2009    Zhu et al.

FOREIGN PATENT DOCUMENTS

| DE | 10040550 A1 | 2/2002 |
| EP | 1064568 B1 | 11/2005 |
| WO | 2009002156 A1 | 12/2008 |

OTHER PUBLICATIONS

Examination Report issued in German Application No. 10 2012 222 986.4 dated Aug. 14, 2013, 6 pages.
Corresponding to EPO Office Action dated Mar. 19, 2014 for 13193007.5-1811.

*Primary Examiner* — Christle I Marshall
(74) *Attorney, Agent, or Firm* — Nath, Goldberg & Meyer; Jerald L. Meyer

(57) ABSTRACT

The invention relates to an RFID reading tunnel for identifying objects by means of RFID having a screen for electromagnetic radiation which forms the tunnel and has side walls and a cover part, a cover device or conveying device for the object in or through the tunnel and at least one RFID reader having at least one RFID antenna. To provide an improved RFID reading tunnel which is less expensive and can be installed more easily, it is proposed that the screen is formed by modules which can be variably and releasably connected to one another and that the modules are selected from a kit of predefined modules.

10 Claims, 4 Drawing Sheets

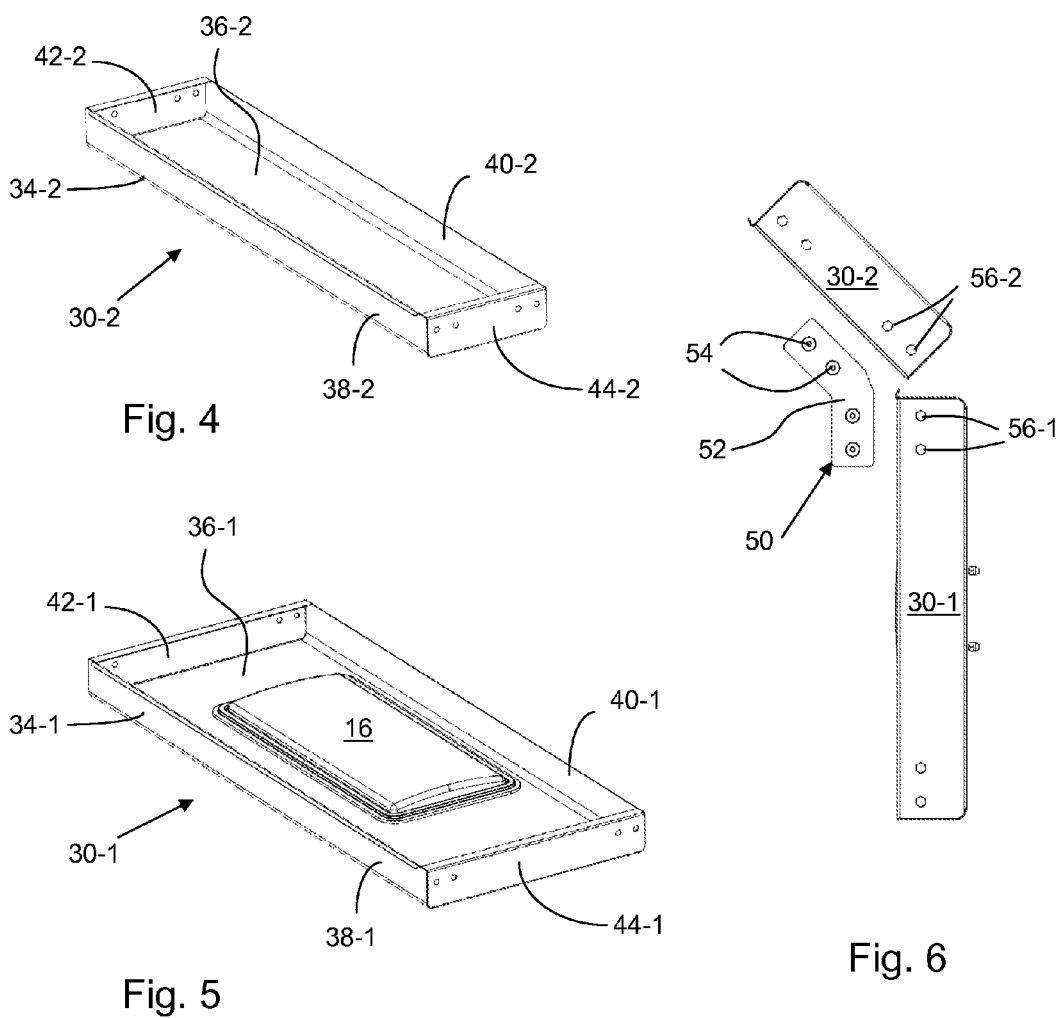

RFID READING TUNNEL FOR IDENTIFYING OBJECTS BY MEANS OF RFID

Figure 1:
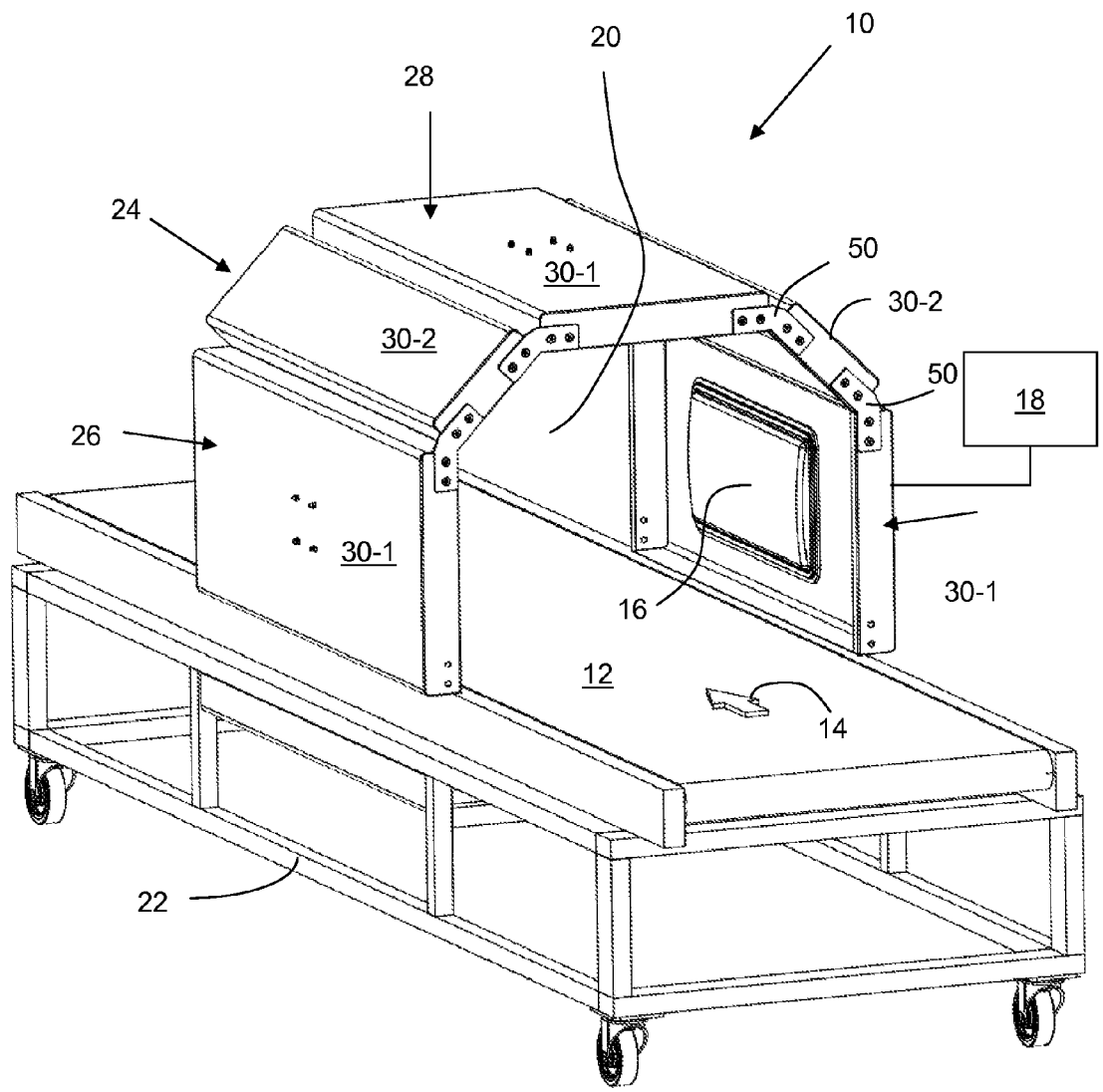

The invention relates to an RFID reading tunnel for identifying objects by means of RFID in accordance with the preamble of claim 1.

Such RFID reading tunnels are known, for example, from the documents DE 100 40 550 A1, EP 1 064 568 B1 and WO 2009/002156 A1 and are frequently installed at automatic flight baggage systems and parcel sorting systems. Each object (piece of baggage or parcel) bears an RFID transponder which is read out by an RFID reader so that an individual further treatment of the object can take place according to the information stored in the transponder.

The RFID reading device only works with an RFID antenna which transmits and/or receives the electromagnetic radiation. Since such antennas show high scatter in the radio frequency range and since the radiation interferes outside the radio station, on the one hand, and since the radiation is itself subject to interference by surrounding metal surfaces or articles, on the other hand, a screening is necessary which screens, on the one hand, and creates constant electromagnetic reading conditions in the reading zone, on the other hand. Due to the large reading zone of such systems and due to the desired all-round screening, with inlet and outlet openings for the objects having to remain, such a screen forms a tunnel.

Each reading tunnel is individually dimensioned and individually produced in accordance with the provided use in order to create respective constant electromagnetic environmental conditions at the different systems in the reading zone.

This is correspondingly expensive and time-consuming since an individual construction requires an individual engineering of the tunnel and an individual assembly. A reading tunnel cannot be adapted, or can only be adapted with a great effort, to new specific conditions once it has been assembled and a new construction has to be prepared as a rule. Furthermore, such reading tunnels are very large as a rule since all types of baggage or parcels have to be able to be conveyed through them so that the tunnel walls can only be assembled by a number or persons or lifting devices.

Starting from this prior art, it is the object of the invention to provide an improved RFID reading tunnel which is less expensive and which can be installed more simply.

This object is satisfied by an RDIF reading tunnel having the features of claim 1.

The RFID reading tunnel in accordance with the invention comprises a screen for electromagnetic radiation, which forms the tunnel and has side walls and a cover part, a cover device or conveying device for the object in or through the tunnel and at least one RFID reader having at least one RFID antenna. In accordance with the invention, the screen is formed by modules which can be connected to one another variably and releasably and wherein the modules are selected from a kit of predefined modules.

A kit of predefined and thus more or less standardized modules is therefore provided from which the designer selects modules and thus sets up the tunnel. Since the modules are predefined, he has to take fewer into account and only has to build up the desired geometry or size of the tunnel from the predefined modules. This does not only mean a substantial simplification in the design and assembly of the tunnel in accordance with the invention, but also provides the advantageous possibility of carrying out a simple matching of an existing tunnel to new framework conditions. Such new framework conditions can result, for example, on a replacement of system parts, e.g., of the conveyor belt, if namely the new conveyor belt has a different width. The invention also provides the possibility of dismantling an existing tunnel in accordance with the invention from a system and of reinstalling it at a new system, with a very comfortable adaptation to the geometry being able to be made due to the modular design. Overall, the modular design allows a flexible realization of different demands with a small individual engineering effort.

Due to the limited size of the modules, which is only made possible by the modular design, the modules and thus the tunnel are very easy to transport and can be assembled simply and quickly on site. Lifting tools or a number of persons are not necessary for the setup. Transport costs and assembly costs are thus substantially reduced.

In a further development of the invention, the predefined modules are configured as standard modules, and indeed as a simple screen module and/or as a screen module with an additional absorber and/or as a s screen module with an antenna and/or as a screen module with an antenna and with an absorber. Most demands on RFID reading tunnels can be satisfied using such a module kit.

It is advantageous if the individual modules have a tub-like construction with a planar tub bath which forms the tunnel wall. Such a simple construction has a small production depth and can be manufactured correspondingly inexpensively. The tub can also serve as a simple receiver for an absorber and/or for an antenna.

The modules can be connected to one another via corresponding connection elements at predefined angles for a simple and, in a certain way, standardized connection. In this respect, the connection elements can all be configured as similar and only have different angles so that a respective associated connection element is provided for a specific angle.

In a further development of the invention, the standard modules are configured in rectangular form and all modules have the same length. It would be sensible in this respect if there are at least two different widths. This increases the variability in the design of a tunnel considerably and sufficiently.

A simple design is possible when the module length defines the tunnel length.

In order not only to permit an RFID reading in the reading tunnel, but also other detection work, in a further development of the invention at least one additional module is provided which can replace a standard module and which is configured as a standard module with an additional barcode reading device for reading a barcode and/or with an additional camera for detecting object features and/or with at least one additional sensor, for example for determining the volume or the weight.

It can be sensible to carry out an RFID reading from below in specific applications. For this purpose, in a further development of the invention, a module is arranged beneath the placing down device or conveying device; it screens the reading volume in the tunnel from below and is optionally configured as a standard module with an antenna.

Figure 2:
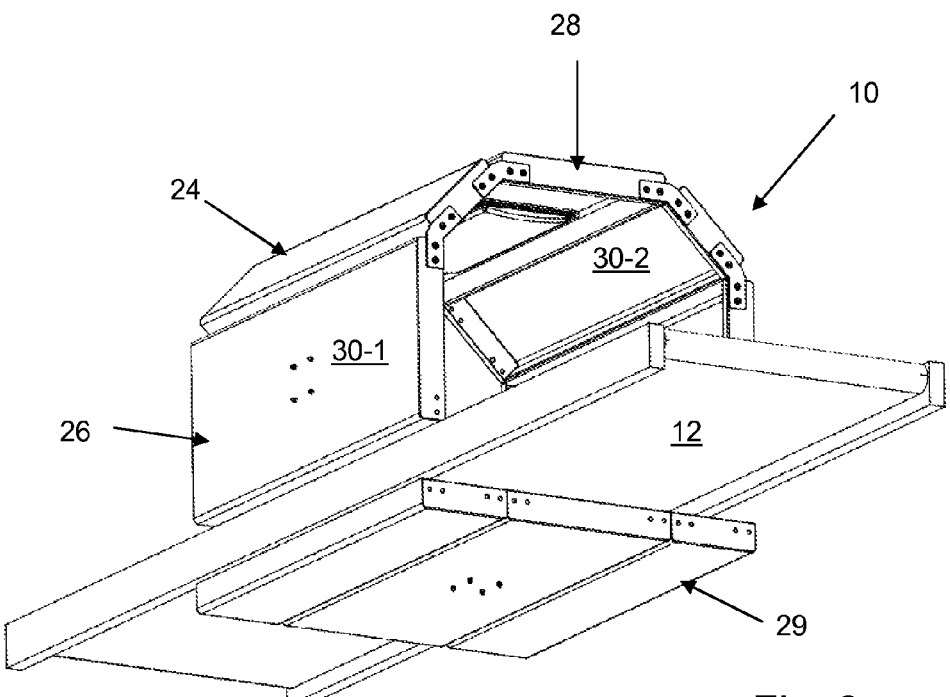
Figure 3:
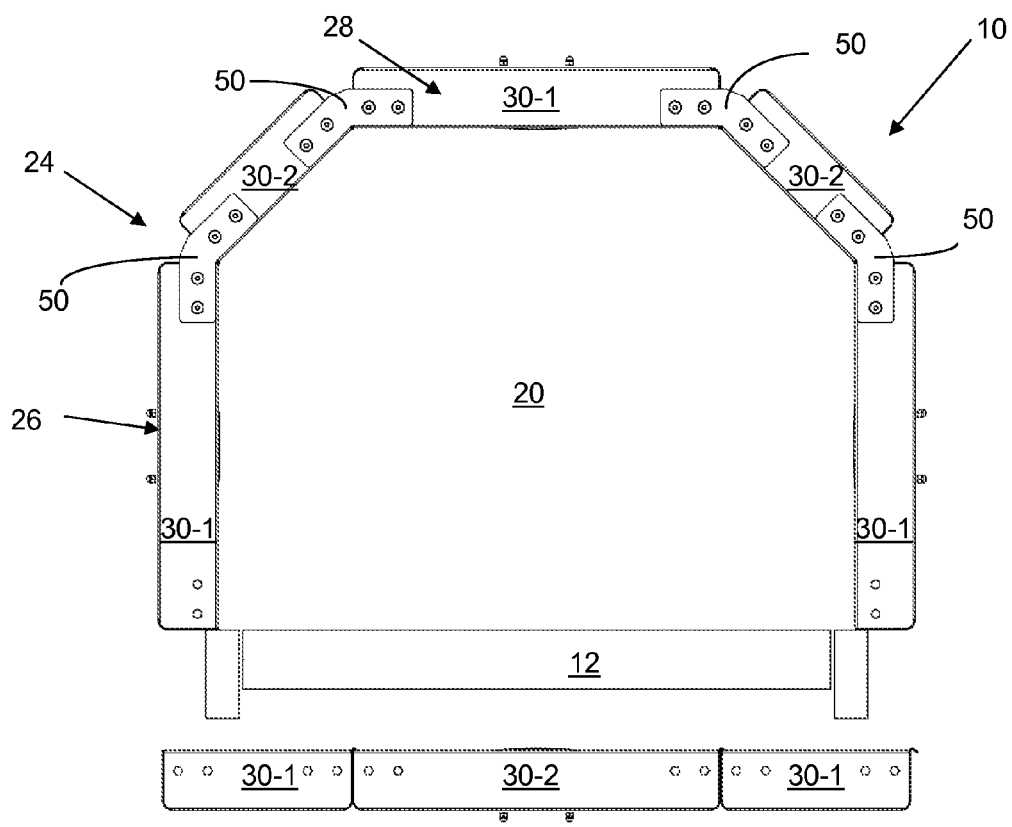
Figure 7:
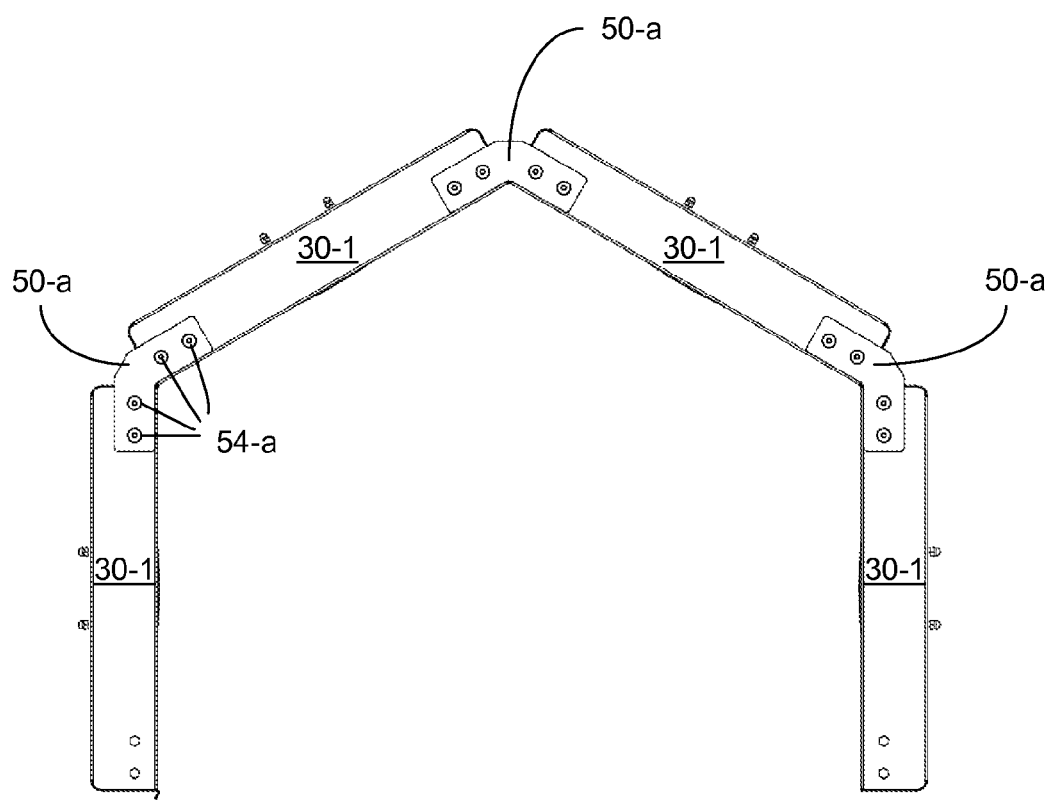

The invention will be explained in detail in the following with reference to embodiments and to the drawing. There are shown in the drawing:

FIG. 1 a perspective view of a schematically represented RFID reading tunnel in accordance with the invention;

FIGS. 2 and 3 views of the RFID tunnel of FIG. 1 without a support frame;

FIGS. 4 and 5 views of two standard modules;

FIG. 6 an exploded view for explaining the connection of two standard modules; and FIG. 7 a view of a further embodiment.

An RFID reading tunnel 10 in accordance with the invention is mounted at a conveyor belt 12 in the embodiment in accordance with FIG. 1. The conveyor belt 12 conveys objects, not shown, which bear an RFID transponder (also called an RFID tag) in a direction 14 through the tunnel 10. RFID antennas 16 are arranged in the tunnel and transmit and receive corresponding RFID signals to be able to read in and/or write the transponders in a reading zone 20 within the tunnel 10. Antennas 16 are connected to an RFID reader 18 for this purpose. The tunnel 10 and the conveyor belt 12 are mounted on a rack 22.

The reading zone 20 is bounded by the screen 24 forming the tunnel so that constant electromagnetic conditions are present in the reading zone 20. The screen 24 comprises side walls 26 and cover parts 28 and, in the embodiments in accordance with FIGS. 1 to 3, also lower parts 29. The side walls 26, cover parts 28 and lower parts 29 are formed in accordance with the invention by modules which, in the embodiment in accordance with FIGS. 1 to 3, are made up only of two different standard modules 30-1 and 30-2.

The standard module 30-1 is shown in a perspective view in FIG. 5 and has a rectangular, tub-like base body 34-1 with a tub base 36-1 and longitudinal tub side walls 38-1 and 40-1 having a length L-1 as well as end face tub walls 42-1 and 44-1 having a length B-1. One of the RFID antennas 16 is fastened in the interior of the tub-like base body 34-1.

The standard module 30-2, which is shown in a perspective view in FIG. 4, has an analog design to the module 30-1 with a base body 34-2, a tub base 36-2, longitudinal tub side walls 38-2 and 40-2 as well as end face tub walls 42-2 and 44-2. However, unlike the module 30-1, the width B-2 of the module 30-2 is smaller.

An absorber absorbing electromagnetic radiation is provided in the interior of the tubs 34-1 and 34-2.

In this manner, a kit of predefined modules can be configured as standard modules, wherein the standard modules can comprise, in the described manner, simply the tub-like base body and can thus form a simple screen module or can contain an additional absorber or can contain an antenna or can contain both an antenna and an absorber. Such a kit would then have four standard modules differing in design which can optionally each have two different widths.

The standard modules can be variably and releasably connected to one another along their longitudinal sides at predefined angles via corresponding connection elements 50 for a simple and, in a certain manner, standardized connection. This should be shown in FIG. 6 in which the parts to be connected are, however, shown separately. The connection elements 50 are all configured as similar and are fixed at the end faces 42-x and 44-x for connecting the modules along their longitudinal sides 36-x and 38-x ("x" is a placeholder for "1" or "2"). In the embodiment in accordance with FIGS. 1 to 3, the connection elements 30 comprise a metal plate 52 and connect two modules 30-1 and 30-2 by means of fastening means such as screws via correspondingly positioned holes 54. The modules likewise have for the purpose correspondingly positioned holes 56-1 and 56-2 for the fastening means in their end faces. The holes 54 of the connection element 50 are positioned such that the connected modules 30-1 and 30-2 form an angle of 135°.

Other angles are conceivable and sensible, as the embodiment in accordance with FIG. 7 shows in which the connection element 50-a is dimensioned and the holes 54-a are positioned such that the connected modules include an angle of 120°. In this embodiment, the reading tunnel comprises four standard modules 30-1.

Overall, an RFID reading tunnel is thus set up which can have a very flexible design. Each standard module serves at least as a screen and at least one standard module has to include an RFID antenna so that an RFID reading is possible at all. It can be sensible to carry out an RFID reading from below in specific applications. For this purpose, a standard module having an antenna is arranged beneath the placing down device or conveying device; it screens the reading module in the tunnel from below and can read an RFID tag by means of the antenna.

In order not only to allow an RDIF reading in the reading tunnel 10, additional modules, not shown, can be provided. Such an additional module generally has the same design as a standard module, that is it has the tub-like base body with the same dimensions as a standard module. In addition, however, an additional device is provided in the additional module such as a barcode reader for reading a barcode and/or a camera for detecting object features and/or a sensor, e.g. a laser scanner, for the volume determination and a sensor for the weight determination. Since the additional module is designed like a standard module, it can replace a standard module in the tunnel so that a reading tunnel equipped in this manner can satisfy further functions such as a barcode reading in addition to an RFID reading.

It must again be stressed that a plurality of RFID reading tunnels of different sizes and shapes can be set up using the modules and connection elements described and only two embodiments (FIG. 1 and FIG. 7) are described by way of example in this description for illustrating the principle of the invention.

The invention claimed is:

1. An RFID reading tunnel for identifying objects by means of RFID having a screen (24) for electromagnetic radiation which forms the tunnel (81) and has side walls (26) and a cover part (28), a placing down device or conveying device (14) for the object in or through the tunnel (10) and at least one RFID reader (18) having at least one RFID antenna (16), wherein the screen (26) is formed by modules (30-1, 30-2) which are configured to be connected to one another variably and releasable; and wherein the modules (30-1, 30-2) are selected from a kit of predefined modules (30-1, 30-2).

2. The RFID reading tunnel in accordance with claim 1, wherein the predefined modules are standard modules which are configured as at least one member from the group comprising:
   screen modules;
   screen modules with an additional absorber;
   screen modules with an antenna; and
   screen modules with an antenna and with an absorber.

3. The RFID reading tunnel in accordance with claim 1, wherein the individual modules have a tub-like construction with a planar tub base which forms the tunnel wall; and wherein the modules are configured to be connected to one another at predefined angles.

4. The RFID reading tunnel in accordance with claim 3, further comprising a respectively associated connection element for a specific angle.

5. The RFID reading tunnel in accordance with claim 1, wherein the standard modules are configured as rectangular and all the modules have the same length.

6. The RFID reading tunnel in accordance with claim 5, wherein the module length defines the tunnel length.

7. The RFID reading tunnel in accordance with claim 5, wherein standard modules of a similar type are provided with different widths.

8. The RFID reading tunnel in accordance with claim 1, further comprising at least one further additional module, said at least one further additional module replacing a standard module and the additional module being configured as a standard module having at least one of the following members selected from the group comprising:
- an additional barcode reading device;
- an additional camera for detecting object features; and
- at least one additional sensor for recognizing object properties.

9. The RFID reading tunnel in accordance with claim 8, wherein the least one additional sensor for recognizing object properties is configured to recognize one of the volume and weight of an object.

10. The RFID reading tunnel in accordance with claim 1, wherein a module is arranged beneath the placing down device or conveyor device.

* * * * *